United States Patent
Rudd

(10) Patent No.: US 9,551,183 B2
(45) Date of Patent: Jan. 24, 2017

(54) LADDER SAFETY DEVICE HAVING A BUILDING CLAMP ASSEMBLY AND A LADDER HOOK ASSEMBLY

(71) Applicant: David Michael Rudd, San Antonio, TX (US)

(72) Inventor: David Michael Rudd, San Antonio, TX (US)

( * ) Notice: Subject to any disclaimer, the term of this patent is extended or adjusted under 35 U.S.C. 154(b) by 0 days.

(21) Appl. No.: 14/669,144

(22) Filed: Mar. 26, 2015

(65) Prior Publication Data

US 2016/0281428 A1      Sep. 29, 2016

(51) Int. Cl.
| | | |
|---|---|---|
| *A47B 95/00* | (2006.01) | |
| *E06C 7/48* | (2006.01) | |
| *F16B 2/12* | (2006.01) | |
| *F16B 2/18* | (2006.01) | |

(52) U.S. Cl.
CPC . *E06C 7/48* (2013.01); *F16B 2/12* (2013.01); *F16B 2/185* (2013.01)

(58) Field of Classification Search
CPC ............ E06C 7/48; E06C 7/482; E06C 7/484; E06C 7/486; E06C 7/488; F16B 2/12; F16B 2/185
USPC .................. 248/210, 211; 182/107, 214, 206
See application file for complete search history.

(56) References Cited

U.S. PATENT DOCUMENTS

| | | | |
|---|---|---|---|
| 1,205,594 A * | 11/1916 | Close ........................ | E06C 7/48 182/206 |
| 1,374,060 A | 4/1921 | Chute | |
| 3,268,196 A | 8/1966 | Anton | |
| 3,603,431 A | 9/1971 | Nameche | |
| 3,712,419 A | 1/1973 | O'Hara | |
| 3,910,380 A | 10/1975 | Nameche | |
| 3,979,097 A * | 9/1976 | Balne ........................ | E06C 7/14 182/129 |

(Continued)

*Primary Examiner* — Christopher E Garft
(74) *Attorney, Agent, or Firm* — Jackson Walker, LLP

(57) ABSTRACT

A house clamp assembly having a fixed jaw and a slide bar mounted movable jaw, the fixed jaw opposing the movable jaw. A one-way drive means, by operation of a trigger handle grip, releasably engages the slide bar and advances the movable jaw towards the fixed jaw. The one-way drive means is incapable of moving the slide bar and movable jaw away from the fixed jaw. A return motion of the movable jaw (separating) is accomplished manually when the one-way drive means is disengaged. A braking lever, which is biased to bind the slide bar, prevents reverse motion of the slideable jaw away from the fixed jaw, except when the first lever is disengaged from the slide bar. A device for securing a ladder to a building, wherein the removed end of the slide member has a hook shape; wherein the jaws include jaw faces having multiple raised portions, wherein the releasable braking means of the building clamp assembly means includes a pivoting lever; wherein the locking member of the ladder hook assembly includes a pivoting lever, attached at one end to the body, and having a slot dimensioned to slideably receive the hook slide member therethrough; wherein the body of the ladder hook assembly includes a pair of slots dimensioned for and adapted to slideably receive the slide member therethrough; and wherein the slots are arranged to maintain the hook slide member substantially parallel to the slide bar of the building clamp assembly.

9 Claims, 13 Drawing Sheets

(56) References Cited

U.S. PATENT DOCUMENTS

| | | | | |
|---|---|---|---|---|
| 4,089,390 A * | 5/1978 | McLain | E06C 1/36 | 182/206 |
| 4,143,743 A * | 3/1979 | Larson | E06C 7/48 | 182/107 |
| 4,280,590 A * | 7/1981 | Polizzi | E06C 7/48 | 182/107 |
| D272,857 S | 2/1984 | Leach | | |
| 5,383,533 A | 1/1995 | Nikula et al. | | |
| 6,044,930 A | 4/2000 | Hayman | | |
| 6,394,229 B1 * | 5/2002 | Hastreiter | E06C 1/12 | 182/107 |
| 6,550,577 B1 * | 4/2003 | Allgire | E06C 7/486 | 182/107 |
| 6,837,338 B2 | 1/2005 | Grover | | |
| 7,036,807 B1 | 5/2006 | Gasparyan et al. | | |
| 7,134,525 B1 * | 11/2006 | Ferris | E06C 7/486 | 182/107 |
| 7,913,964 B1 * | 3/2011 | Kennedy | E06C 7/14 | 248/210 |
| 8,316,993 B1 * | 11/2012 | Rudd | E06C 7/48 | 182/107 |
| 2006/0054390 A1 | 3/2006 | Ray | | |
| 2006/0124394 A1 * | 6/2006 | Bracken | E06C 1/34 | 182/107 |
| 2006/0272894 A1 | 12/2006 | Hein et al. | | |
| 2007/0251762 A1 * | 11/2007 | Charlton | E06C 7/486 | 182/107 |
| 2008/0202851 A1 * | 8/2008 | Schwenke | E06C 7/48 | 182/107 |
| 2010/0140017 A1 * | 6/2010 | Wiseman | E06C 7/48 | 182/107 |
| 2014/0166397 A1 * | 6/2014 | Reynolds | E06C 7/188 | 182/107 |
| 2014/0174853 A1 * | 6/2014 | Charlton | E06C 7/486 | 182/107 |
| 2015/0191976 A1 * | 7/2015 | Mosier | E06C 7/188 | 182/107 |
| 2015/0375369 A1 * | 12/2015 | Noniewicz | F16B 2/185 | 24/528 |

* cited by examiner

LADDER SAFETY DEVICE HAVING A BUILDING CLAMP ASSEMBLY AND A LADDER HOOK ASSEMBLY

FIELD OF THE INVENTION

This invention relates to an improved ladder safety device that is adapted to be fixedly engaged to a fascia board or other structure on a building in a safe and stable manner, following which the ladder is engaged to the device for secure maintenance of the ladder against the building structure.

BACKGROUND OF THE INVENTION

The present invention has been devised to avoid certain problems inherent in the prior art. For example, the prior art does not provide for a ladder stabilizing device that will positively engage a building quickly and easily and, which will likewise, quickly and easily engage to a ladder. Moreover, prior art devices tend to be difficult to install easily and quickly, which difficulty is aggravated by the operator being on the ladder and attempting the installation process. That is to say, ease and simplicity of engagement and disengagement of a ladder stabilizing device is more important because of the dangerous environment of a ladder user, typically perched above the ground.

OBJECTS OF THE INVENTION

It is an object of Applicant's present invention to provide a bar clamp wherein the movable jaw may be moved over a long distance rapidly and which may then incrementally and precisely be advanced tightly against building structure captured between the fixed and moving jaw.

It is another object of Applicant's present invention to provide for a ladder stabilizing device that is quick and easy to install without tools, easy to put on and remove, requiring a minimum of adjustment, and that is compact and portable.

It is another object of Applicant's present invention to provide a ladder stabilizing device that does not get in the way of the user climbing the ladder and is adjustable to fit different sized ladders and structures.

It is yet another object of Applicant's present invention to provide for an improved, quick action clamp, where the clamp operation may be accomplished with a minimum of manual manipulation.

Still other objects of Applicant's present invention will become apparent from the specifications. The invention comprises the features of construction, the combination of elements, and the arrangement of parts which will be exemplified in the description hereinafter set forth.

SUMMARY OF THE INVENTION

Applicant provides a novel ladder stabilizing device comprising two assemblies joined together. More specifically, Applicant's ladder stabilizing device is comprised of a house clamp assembly designed for positively engaging a house and a ladder hook assembly designed for positively engaging a ladder, so as to couple the house to the ladder.

More specifically, Applicant provides a house clamp assembly having a fixed jaw and a slide bar mounted movable jaw, the fixed jaw opposing the movable jaw. A one-way drive member, by operation of a trigger handle grip, releasably engages the slide bar and advances the movable jaw towards the fixed jaw. The one-way drive member is incapable of moving the slide bar and movable jaw away from the fixed jaw. A return motion of the movable jaw (separating) is accomplished manually when the one-way drive member is disengaged. A braking lever, which is biased against the slide bar, prevents reverse motion of the slideable jaw away from the fixed jaw, except when the first lever is disengaged from the slide bar.

Applicant provides a device for securing a ladder to a building, wherein a removed end of a slide member has a hook shape; wherein jaws include jaw faces having multiple raised portions, wherein a releasable braking means of the building clamp assembly means includes a pivoting lever; wherein a locking member of the ladder hook assembly includes a pivoting lever, attached at one end to a body, and having a slot dimensioned to slideably receive the hook slide member therethrough; wherein a body of the ladder hook assembly includes a pair of slots dimensioned for and adapted to slideably receive the slide member therethrough; and wherein the slots are arranged to maintain the hook slide member substantially parallel to the slide bar of the building clamp assembly.

Applicant provides a method for securing a ladder to a wall, with a pair of devices including a building clamp assembly and a ladder hook assembly, wherein the building clamp assembly comprises a body including a fixed jaw and a hand grip, a slide bar having a moveable jaw at a removed end thereof, means including a pivoting trigger handle for moving the movable jaw and fixed jaw together, and releasable braking means for releasably preventing the fixed jaw and movable jaws from separating, and wherein the ladder hook assembly is engaged with the building clamp assembly and includes a body, a slide member having a removed end, which slide member slideably engages the body, having a removed end, and a locking member, which releasably fixes the distance of the removed end of the slide member with respect to the body, the method Including the steps of: first securing a first device of the pair to the building by attachment of the first device between the two jaws thereof, followed by securing the slide member of the ladder hook assembly to either a first rung end or first rail of the ladder; and second securing a second device of the pair to the building by attachment of the second device between the two jaws thereof, followed by securing the slide member of the ladder hook assembly to either a second rung end or a second rail of the ladder.

BRIEF DESCRIPTION OF THE DRAWINGS

FIG. 3A, a side elevational; and FIG. 3B, a side elevational view taken from the side of FIG. 3A.

DETAILED DESCRIPTION OF THE PREFERRED EMBODIMENT

FIGS. 1-5 illustrate a first embodiment of Applicant's novel ladder stabilizing device 10. A ladder stabilizing device 10 is seen to be comprised of two assemblies, a house clamp assembly 12 and a ladder hook assembly 14. The house clamp assembly 12 is designed to fixedly engage the ladder stabilizing device 10 to a part of a house, typically a depending board sometimes referred to as a fascia board (see FIGS. 3A and 3B). The ladder hook assembly 14 is designed to engage a ladder L, typically along the rail thereof (see FIGS. 3A and 3B). By having a portion of the ladder stabilizing device 10 that will fixedly and rigidly engage a part of a building, and a ladder hook assembly that will couple to a portion of a ladder, such as a ladder rung or a ladder rail, one can stabilize a ladder L against a building or other structure, such as a fascia board, so the two are positively engaged, thus avoiding a possible inadvertent movement of the ladder with respect to the building.

Figure 2:
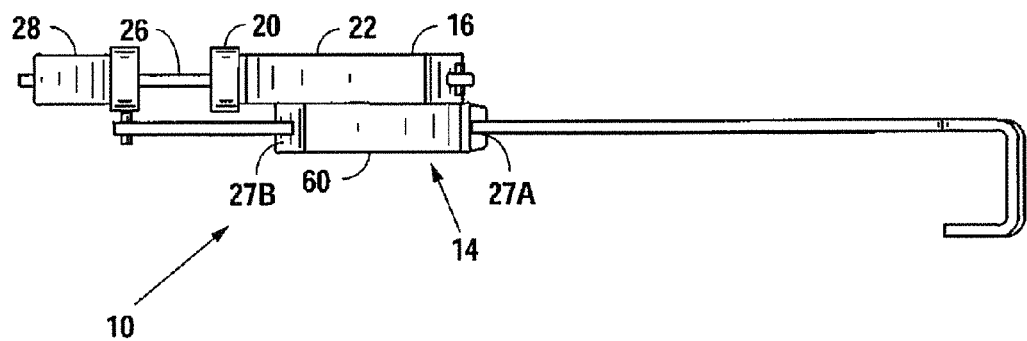
FIG. 2 is a top elevational view of an embodiment of Applicant's ladder stabilizing device.
Figure 1:
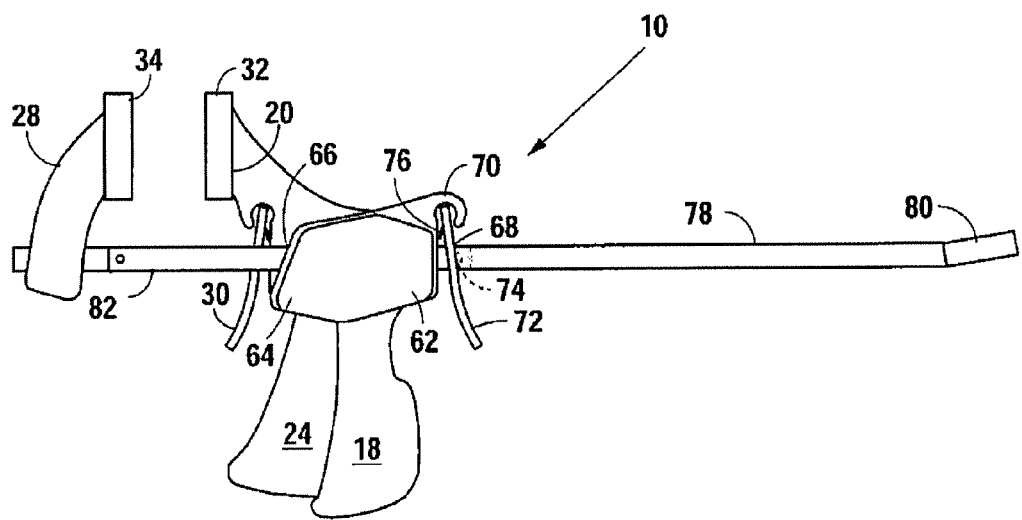
FIG. 1 is a side elevational view of an embodiment of Applicant's ladder stabilizing device.
Figure 1A:
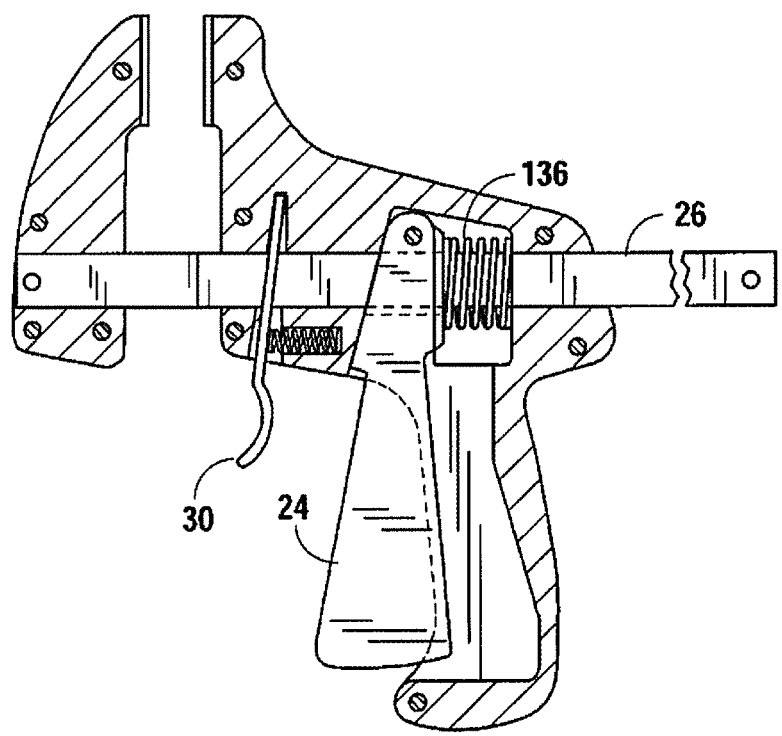
FIG. 1A is an illustration adapted from prior art, U.S. Pat. No. 4,926,722, which is provided to illustrate the manner in which the house clamp assembly of Applicant's first ladder stabilizing device is constructed.

It is seen with reference to FIGS. 1, 1A, 2, 3A, and 3B that the two assemblies are originally together typically in one rigid structure. Moreover, it is seen that house clamp assembly 12 is comprised of a body 16, a portion of which may form a hand grip 18 and a fixed jaw 20, with a clamp housing 22 portion therebetween. That is to say, body 16 is typically a single piece of three portions—hand grip, fixed jaw, and housing. It is to be noted at this point that house clamp assembly 12 is substantially as seen, disclosed and taught as set forth in U.S. Pat. No. 4,926,722, attached hereto and incorporated herein by reference. In fact, FIG. 1A is seen to be the same as FIG. 3 of the '722 patent. Reference to FIG. 1A, as well as the specification and drawings of the '722 patent, will explain the manner of operation of house clamp assembly 12.

Engaging body 16 is a trigger handle 24, which is typically pivotally engaged to the body (see FIG. 1A), and which is spring 136 loaded. The depression of trigger handle 24 will move a slide bar 26 having a movable jaw 28 thereon in a direction towards the fixed jaw 20. A braking lever 30, spring loaded, will allow movement of the movable jaw towards the fixed jaw (or bring the jaws together), but will prevent reversal (separation of the jaws), unless depressed from the position seen in FIG. 1A. Both braking lever 30 and trigger handle 24 have slots therethrough for receipt of slide bar 26 therein.

Figure 3A:
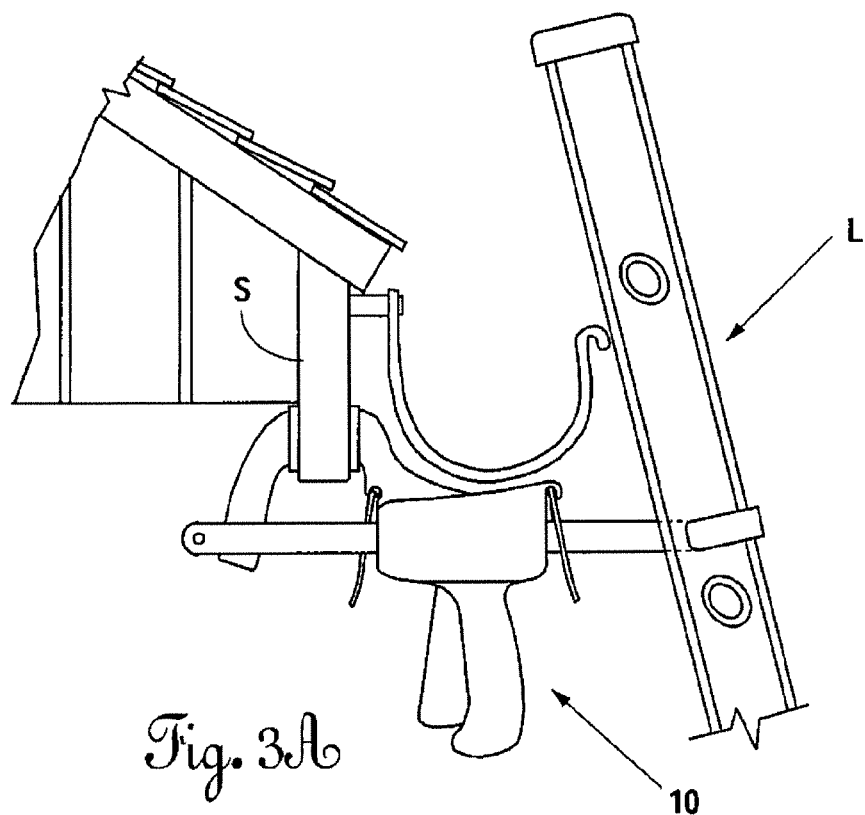
FIGS. 3A and 3B illustrate the manner in which the embodiment of Applicant's present device as set forth in FIGS. 1 and 2 may be used to engage a building.
Figure 3B:
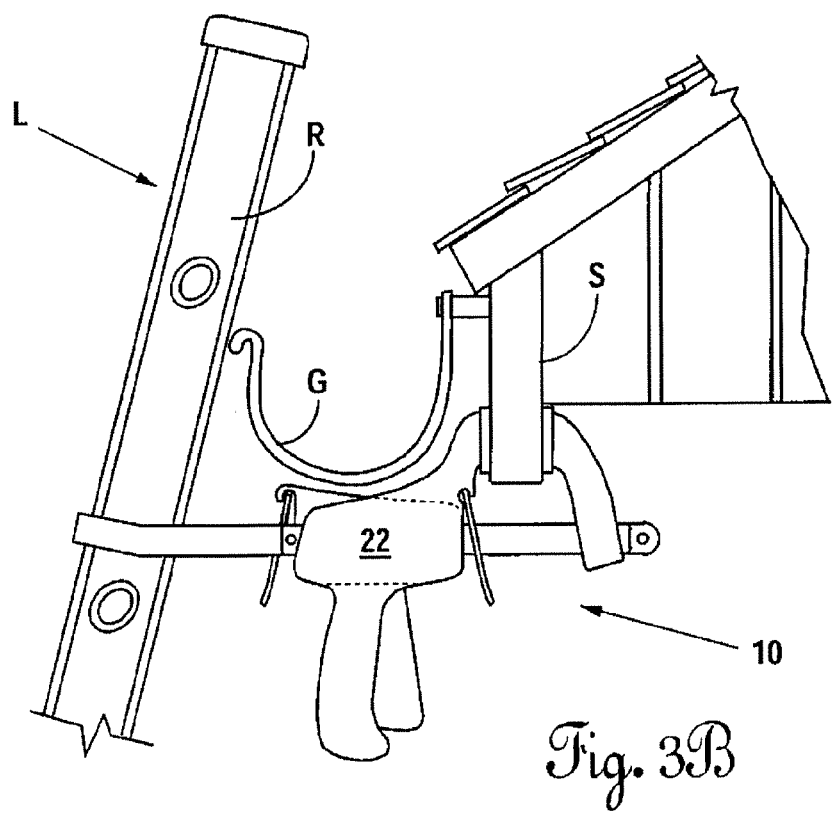

While the repetitive squeezing of trigger handle 24 will allow moveable jaw 28 to move towards fixed jaw 20, one can merely slide the two jaws together without squeezing the handle and thus either way, effectively position pads 32 and 34 (one on each jaw) adjacent the fascia board as illustrated in FIGS. 3A and 3B.

The maximum distance of advance of the movable jaw with one stroke of the trigger handle is limited when the spring is fully compressed or the handle strikes the inner surface of the hand grip. However, the stroke of the trigger handle can be through any lesser arc thereby diminishing the distance the movable jaw travels. Additionally, one may stroke the trigger handle until the jaw is firmly engaged to the fascia board.

It can be seen that the movable jaw can be advanced toward the fixed jaw, with the fascia board therebetween in one continuous motion, merely by pushing on the movable jaw until it is snug up against the fascia board or other workpiece and then slight incremental moves of the handle can compress the jaws further. Removal or separation of the jaws may be accomplished with the depression of the braking lever by, for example, the index finger while the other fingers remain around the handle to stabilize the device.

Turning now to ladder hook assembly 60, it is seen to be fixedly engaged to the housing clamp assembly in a preferred embodiment. Ladder hook assembly 16 is seen to include a body with a forward portion 62 having a slot 68 therein and a rearward portion 64 having a slot 66 therein, the slots for receipt of a hooked slide member 78 therethrough. That is to say, hooked slide member 78 engages the body and maintains alignment with the body and, typically with slide bar 26, through slots 66 and 68. Further engaging the body is a locking lever 72, which has a slot 74 therein. Spring 76 urges locking lever 72, which is engaged at one end to retainer portion 70 of the body biased in a pivoting manner away from forward portion 62 as seen in FIG. 1. Hooked slide member 78 is seen to have a ladder engaging end 80 dimensioned for coupling to the ladder, as by hooking a rail of a ladder, as seen in FIG. 3A. Locking lever 72 allows one-way movement of the hooked slide member 78, that movement being movement of ladder engaging end 80 towards body 60. To reverse the direction of the hooked slide member 78, lever arm 72 must be depressed from the position as illustrated in FIG. 1, thereby allowing the uncoupling of the ladder engaging end 80 with the ladder from the position as seen in FIGS. 3A and 3B. Hooked slide member 72 is located in parallel alignment with slide bar 26 through the use of a pair of slots 27A and 27B in body 14.

Turning now to FIGS. 3A and 3B, it is seen that the house clamp assembly, with fixed and movable jaws, may be securely clamped to a fascia board, such as fascia boards typically depending from the eaves of a house. Moreover, a ladder L may be placed against the gutter G of the house or directly against the edge of the roof of a house, for example. Further, with the slide bar 26 aligned linearly with the hooked slide member 78, a strong coupling force is provided to help prevent lateral movement of the ladder along the house, or movement of the removed end of the ladder off the house. With the jaw of sufficient area, typically between 1 and 3 square inches, any torque or twisting forces generated by a ladder against hooked slide member 78 will be resisted by the jaws clamped firmly to the fascia board.

Figure 4:
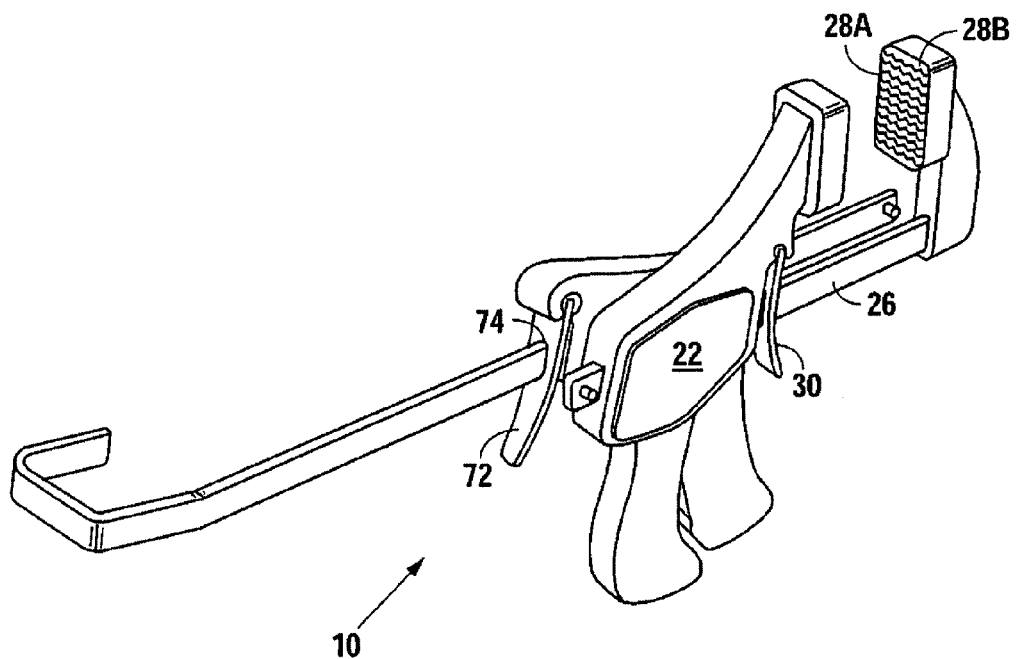
FIGS. 4 and 5 are perspective views of the embodiment of Applicant's invention set forth in FIGS. 1 and 2 above.
Figure 5:
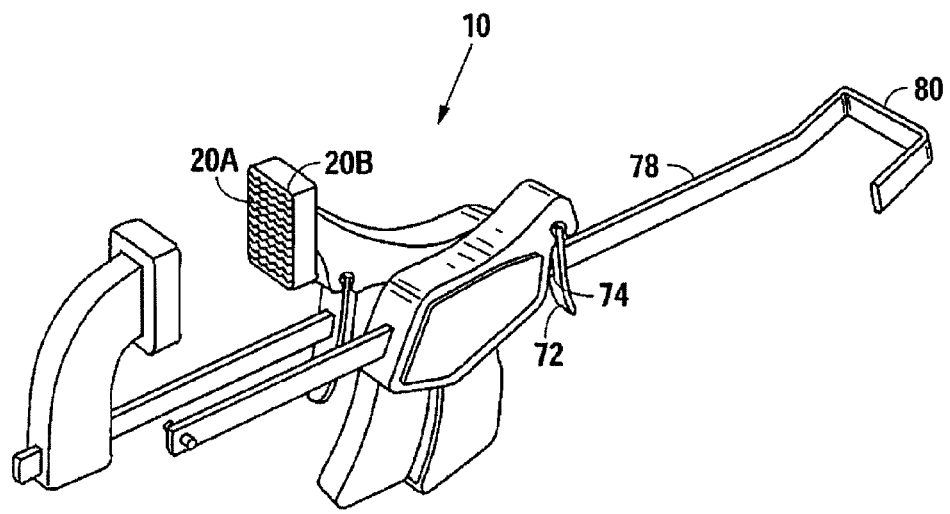

FIGS. 4 and 5 provide further illustration of Applicant's device and also show how both jaws 20/28 may include jaw faces 20A and 20B that have raised areas or pointed projections 20B/23B to help secure the jaws against the workpiece.

Figure 6:
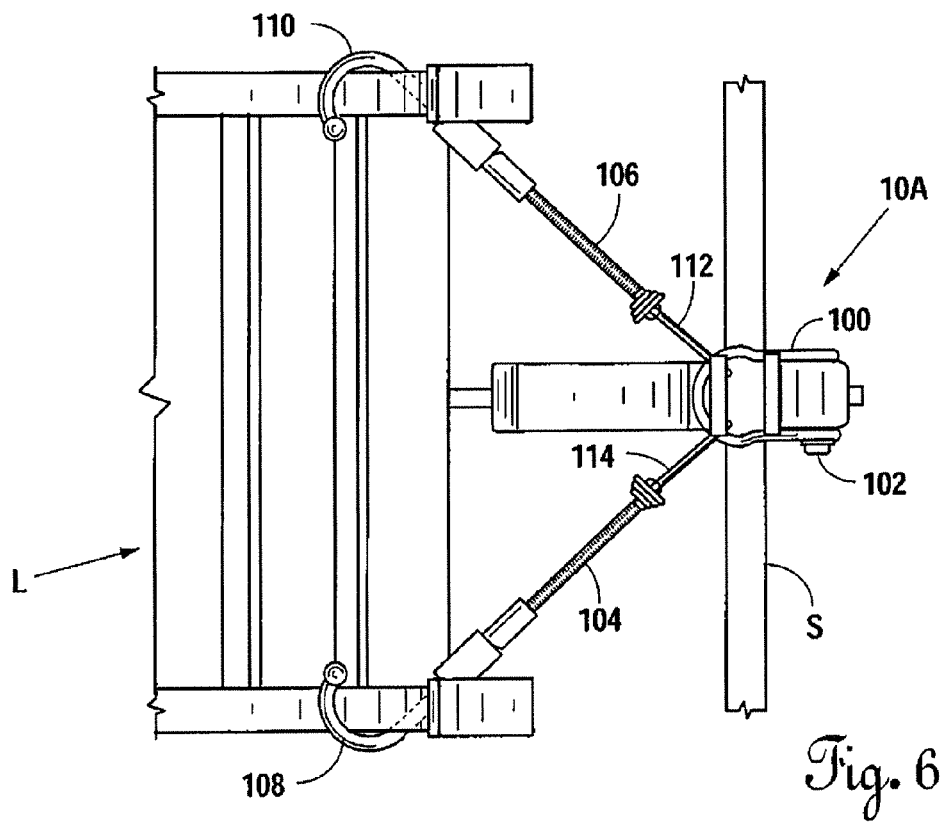
FIGS. 6 and 7 provide top and side elevational views of the second preferred embodiment of Applicant's present invention.
Figure 7:
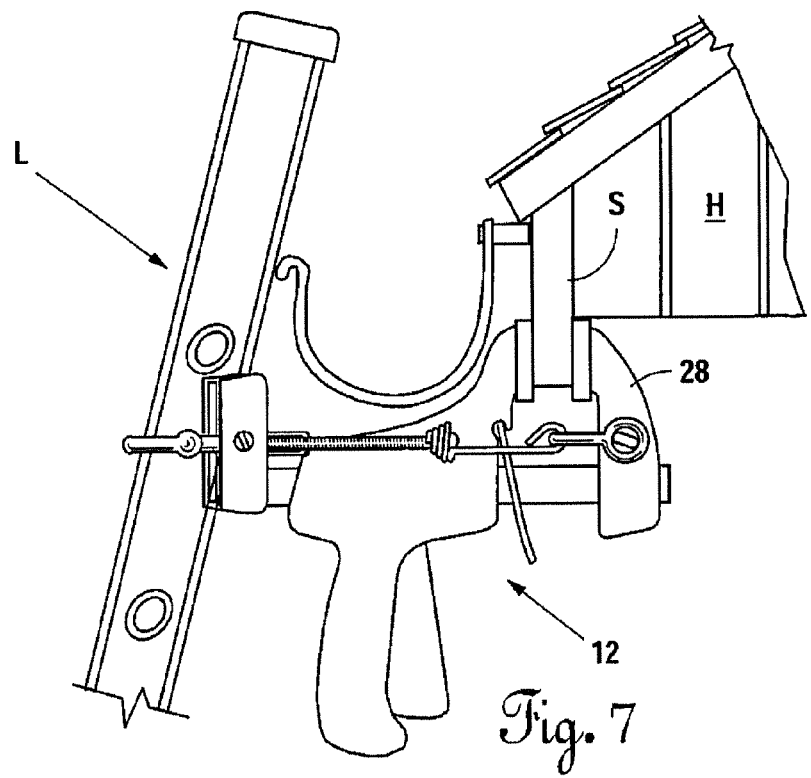

Turning now to FIGS. 6 and 7, a second preferred embodiment of Applicant's present invention is illustrated. This embodiment of ladder stabilizing device 10a consists of the house clamp assembly 12, substantially as set forth in the previous embodiment. However, a ring 100 is pivotally engaged to body 16 as seen in FIGS. 6 and 7 on pin 102. Ring 100 provides for engagement of elastic cords 104 and 106 therewith. The elastic cords are seen to have ladder hooks 108 and 110, dimensioned for receipt of a ladder, such as a ladder rail as illustrated in FIGS. 6 and 7 thereon. Moreover, ladder hooks 108 and 110 are located at removed end of elastic cords 104/106 which provide active tension when ring hooks 112 and 114 engage ring 100. That is to say, as seen in FIGS. 6 and 7, a single house clamp assembly 12 may be engaged to the fascia board as set forth in the first embodiment. The pair of elastic cords 104 and 106 may then be stretched and hooked, with ladder hooks 108 and 110 engaging the rails of a ladder as seen in FIGS. 6 and 7. It is seen that, if the ladder stabilizing device 10a is centered between two rails of the ladder, the elastic cords may prevent lateral movement of the ladder from one side to the other. That is to say, if the ladder were to shift one way, then the elastic cord in the direction of the shift would exert greater force laterally and tend to center the ladder.

Figure 8:
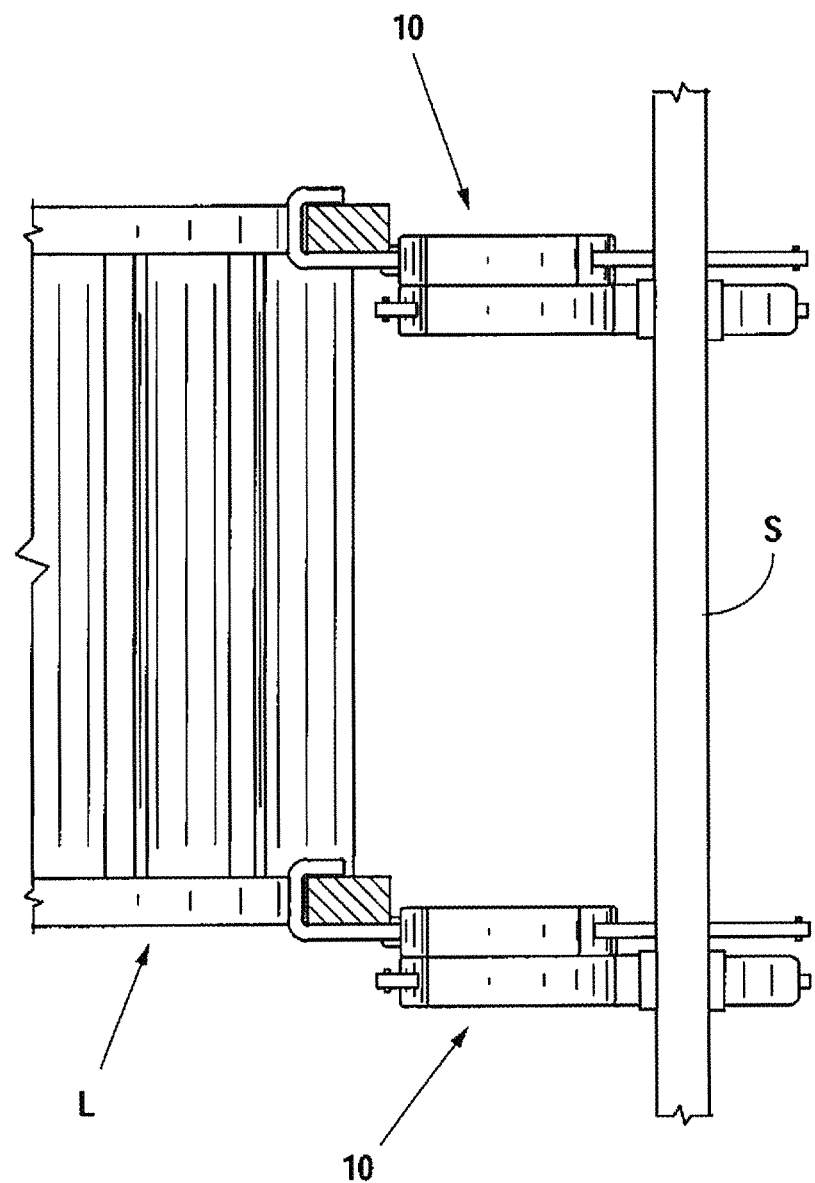
FIG. 8 is a top elevational view of the use of the first embodiment of Applicant's present invention for engaging a building structure.

Turning now to FIG. 8, it is seen that the first embodiment of Applicant's ladder stabilizing device 10 is typically used in a pair for engagement with both rails of the ladder to provide positive and firm coupling of the ladder to the building structure.

Figure 9A:
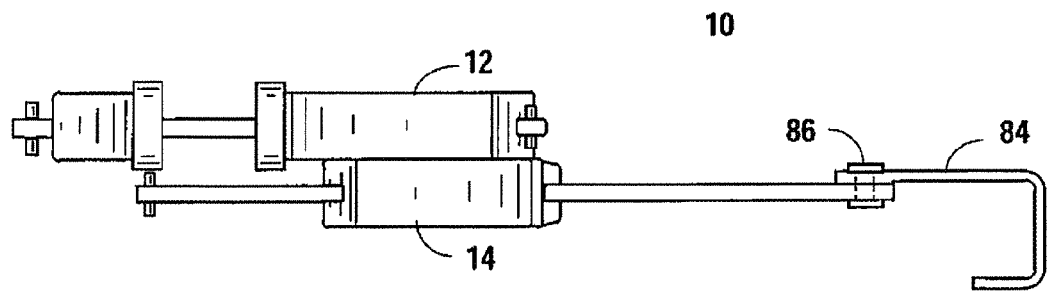
FIGS. 9A and 9B are top and side elevational views, respectively, of a third embodiment of Applicant's present invention.
Figure 9B:
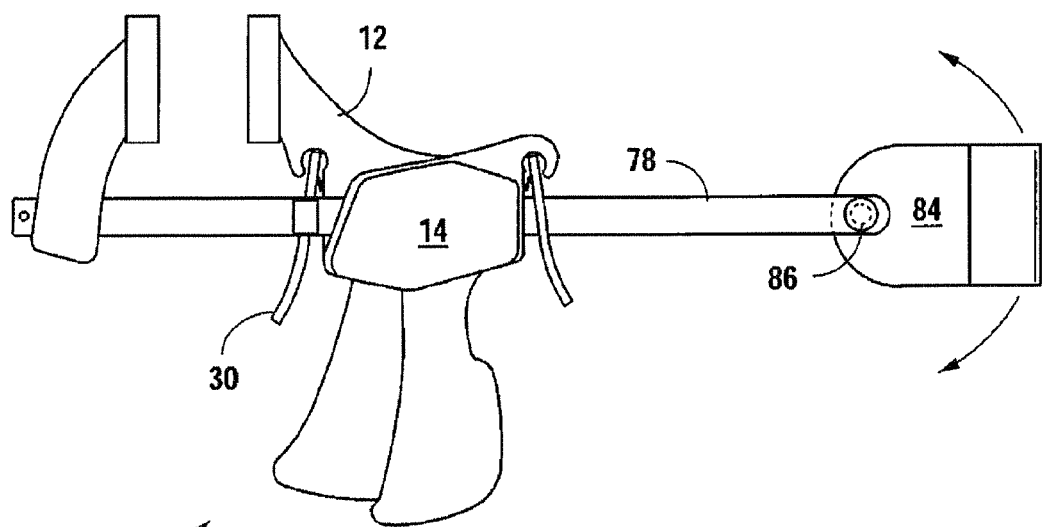
Figure 10:
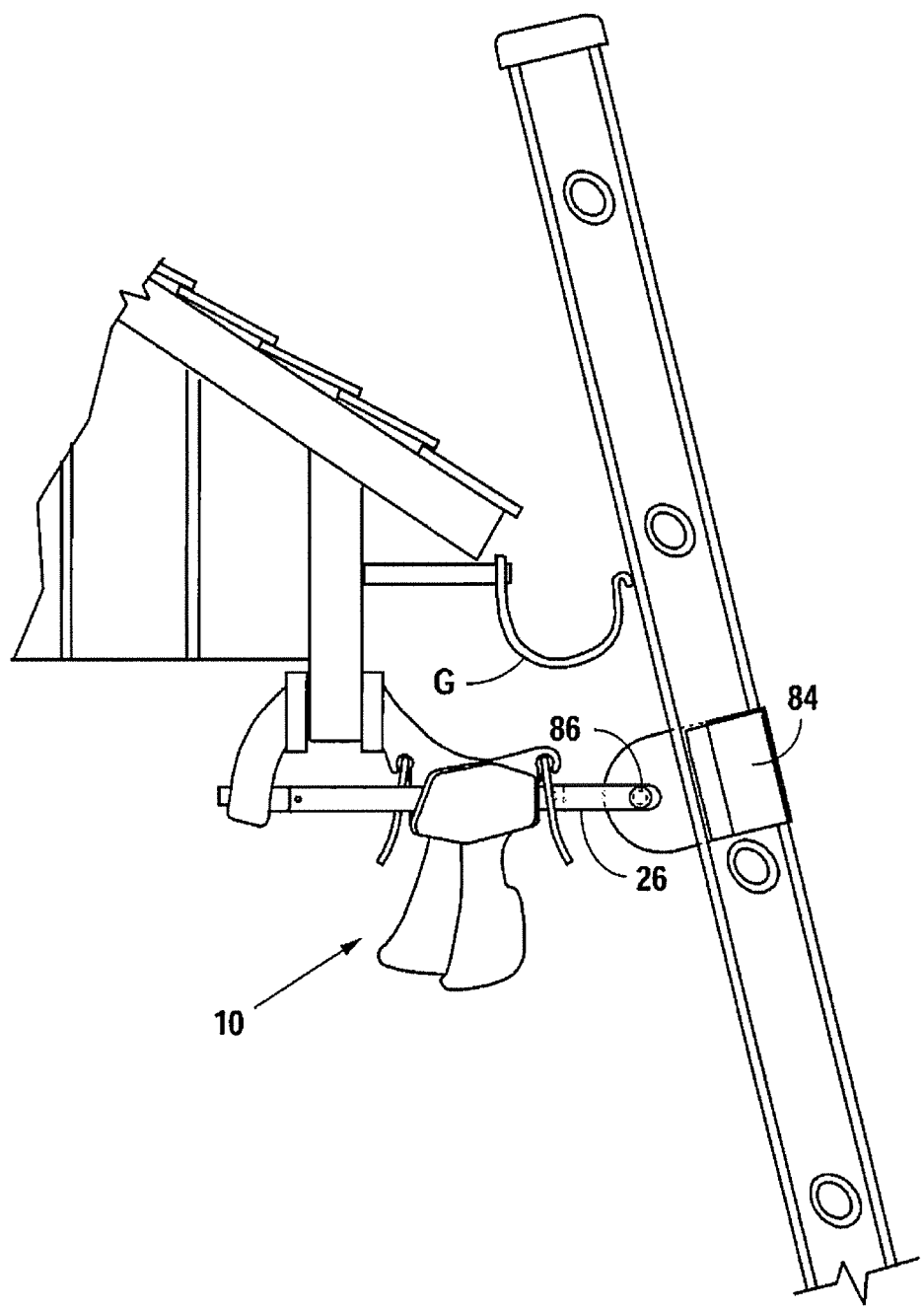
FIG. 10 is an illustration of the third embodiment of Applicant's device as engaged with a building structure.

With respect to FIGS. 9A, 9B, and 10, Applicant provides a third embodiment, including a modification to ladder engaging end 80 of hooked slide member 78. More specifically FIGS. 9A, 9B, and 10 illustrate a pivoting ladder engaging member 84, which articulates on hooked slide member 78 with a pin 86. This modification may be useful, as seen in FIG. 10, as it will tend to provide a broader contact surface with the rail and will angularly adjust to the angle that the rail of the ladder makes with respect to the building structure.

Figure 11:
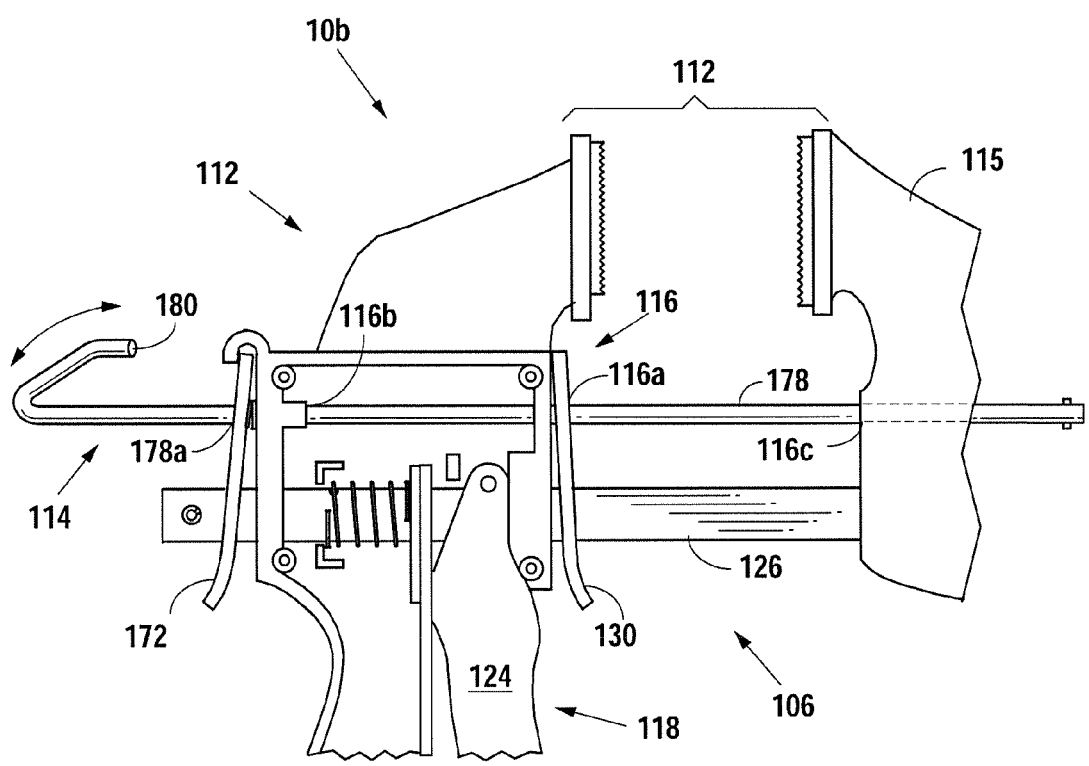
FIGS. 11 through 11F illustrate alternate preferred embodiments of Applicant's device.
Figure 11A:
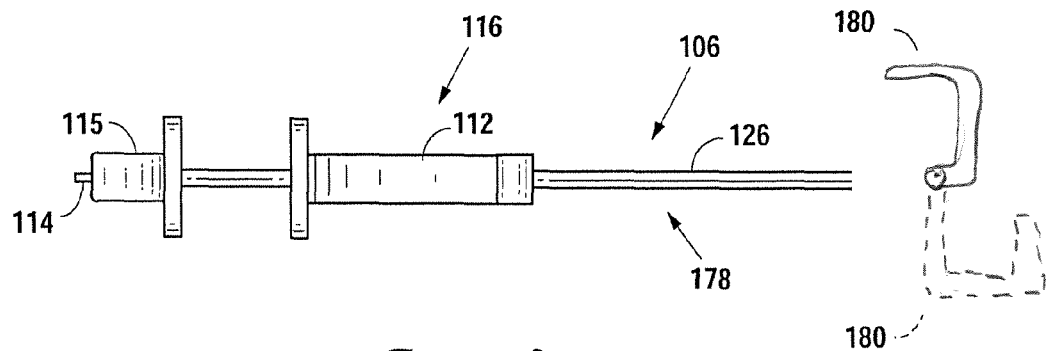
Figure 11B:
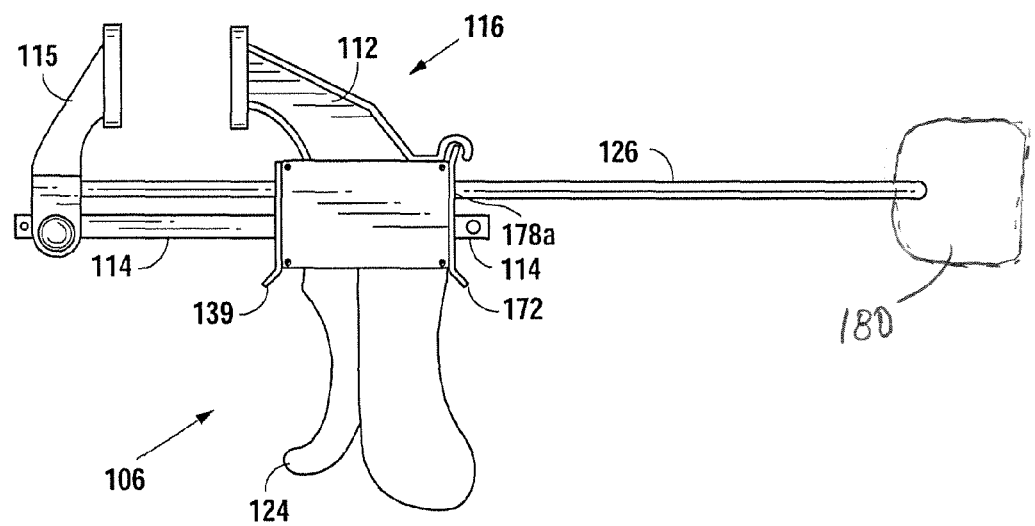
Figure 11C:
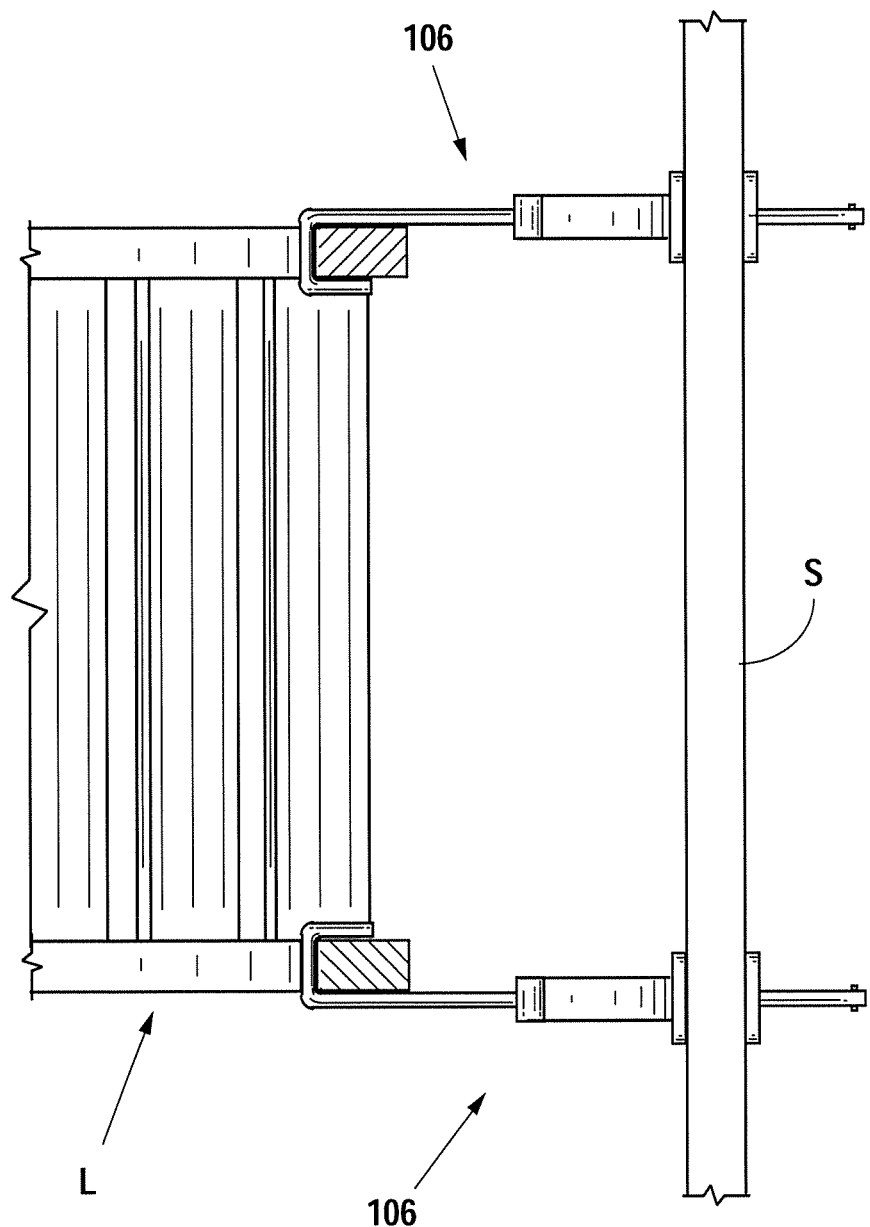
Figure 11D:
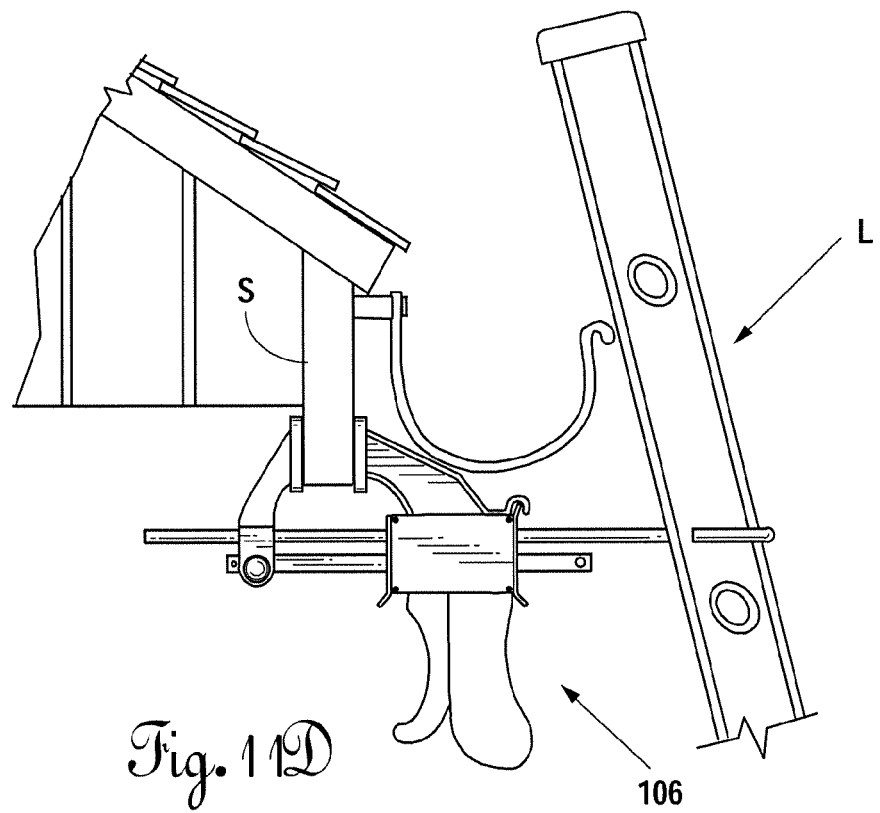
Figure 11E:
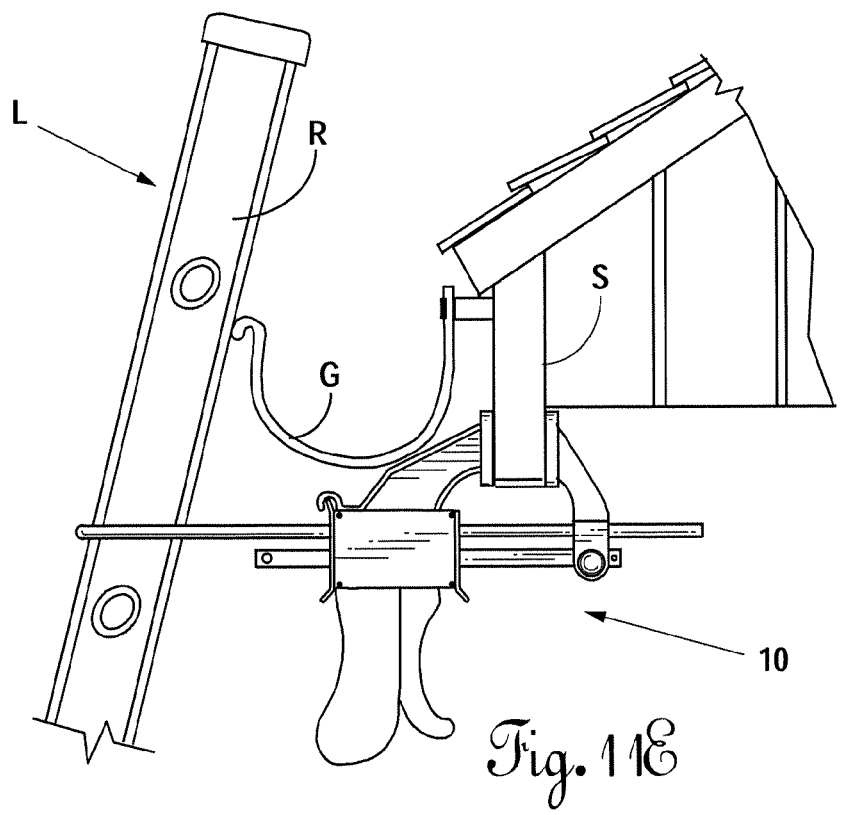
Figure 11F:
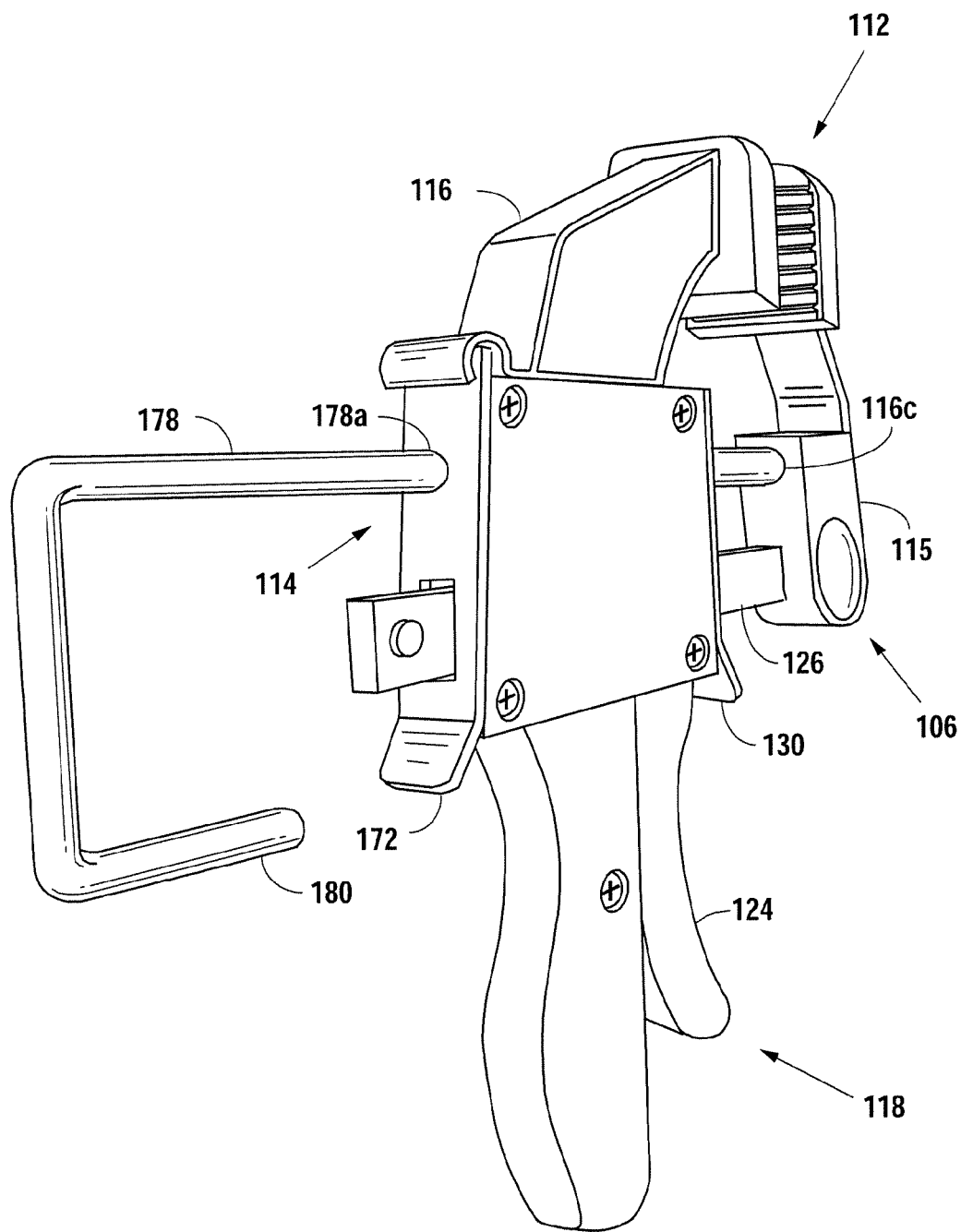

FIGS. 11 through 11F illustrate an alternate preferred embodiment of Applicant's ladder stabilizing device 106. It is seen that a building or house clamp assembly 112 and a ladder hook assembly 114 engage one another through slide bar 126 and hook slide member 178. FIGS. 11 and 11F show the hook slide member 178 stacked above the slide bar 126. FIGS. 11A through 11D show the two side-by-side. Moreover, it is noted that, unlike earlier embodiments, hook slide member 178 is cylindrical and may rotate where it articulates with a body 115 and a body 116 of house clamp assembly 112 through round holes 116a/116b/116c (FIGS. 11, 11F) or 116a/116b (FIGS. 11A through 11D). Locking lever 172 has a round hole 178a where hook slide member 178 passes through it. Locking lever 172 allows one-way movement of the cylindrical slide member from left to right as seen in FIG. 11. Locking lever 130 allows movement of slide bar 126 from right to left as trigger handle 124 is squeezed (moving the jaws together), but prevents movement of the movable jaw to the right as seen in FIG. 11. That is, you can move the moveable jaw in FIG. 11 from the right to the left towards the fixed jaw under the impetus of the squeezing handle or merely by pushing the jaws together relative to one another. By depressing lever 130, the jaws will open. As can be seen in the Figures and, unlike the previous embodiment, hook slide member 178 has a hooked end 180, but hook slide member, or at least a straight portion thereof, is cylindrical and therefore can be rotated to have the hook to the left or right with respect to the jaws, thus allowing the ladder to have either a right or left configuration using one assembly only (see FIGS. 11C, 11D and 11E). That is, one ladder stabilizing device 106 can be sold and configured as either a right or a left-hand jaw by simply rotating hook slide member 178.

FIGS. 11A and 11B show that "J" shaped or hooked end 180 of hook slide member 178 may actually be pivotally attached to the straight cylindrical portion of hook slide member 178 and, therefore, may have the benefits of a pivoting hooked end, such as where they engage a ladder (see FIG. 8).

Therefore, one may see that this embodiment has a cylindrical hook slide member 178 and round orifices where it articulates with the body of the fixed jaw and locking lever 172 as well as where it rotatably engages the body of the moveable jaw in FIGS. 11A and 11F.

As can be seen, the hooked end of the cylindrical member can rotate and slideably engages both jaw bodies. Slide bar 126 can be driven through use of the trigger to pull the jaws closely together and to attach them to a structure of the building. Then one can take their hand and rotate the hook to the proper rotational position and then push it toward both jaws until it tightly engages a portion of the ladder.

When one wishes to remove the device, pulling in lever 130 will release member 126 and allow separation of the jaws for removal. If one desires to release the cylindrical member, they can press lever 172 inward and pull the cylindrical member away from the jaws. This helps, for example, if the jaws are quite tight, one can always release cylindrical member 178 and that will help relieve the pressure between the assembly comprising the jaws and the ladder.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. A device for securing a ladder to a building, the device including:
   a building clamp assembly; and
   a ladder hook assembly;
      wherein the building clamp assembly comprises a body including a fixed jaw, and a body having a moveable jaw, the body having the moveable jaw moveable with respect to the body including the fixed jaw, the building clamp assembly including
         a hand grip, a slide bar slideably engaging the body including the fixed jaw and fixedly attached to the body having the moveable jaw, a pivoting trigger handle on the body including the fixed jaw for moving the body having the moveable jaw and a releasable braking member for releasably preventing the body including the fixed jaw and the body having the moveable from separating; and
      wherein the ladder hook assembly is engaged with the building clamp assembly and includes a cylindrical slide member having a removed end, which the slide member slideably and rotatably engages round apertures within the body including the fixed jaw and the body having the moveable jaw, and a locking member, the locking member having a round hole for receiving the cylindrical slide member, the locking member pivotally engaging the body including the fixed jaw, which the locking member releasably fixes a distance of the removed end of the cylindrical slide member with respect to the body having the fixed jaw.

2. The device of claim 1, wherein the removed end of the cylindrical slide member is hook shaped.

3. The device of claim 2, wherein the removed end of the cylindrical slide member is pivotable with respect to the cylindrical portion.

4. The device of claim 1, wherein the jaws include jaw faces having multiple raised portions.

5. The device of claim 1, wherein each jaw has a jaw face with an area of between about 1 and about 3 square inches.

6. The device claim 1, wherein the releasable braking member of the building clamp assembly includes a pivoting biased lever.

7. The device of claim 1, wherein the round apertures are arranged to maintain the cylindrical slide member substantially parallel to the slide bar of the building clamp assembly.

8. The device of claim 7, wherein the removed end of the slide member has a pivotable hook member.

9. A method of securing a ladder to a wall or fascia board, with a pair of devices each including a building clamp assembly and a ladder hook assembly, wherein the building clamp assembly comprises a body including a fixed jaw and a body having a moveable jaw, the building clamp assembly including a hand grip, a slide bar slidably engaging the body including the fixed jaw and fixedly attached to the body having the moveable jaw, a means including a pivoting trigger handle on the body including the fixed jaw for moving the body including the fixed jaw and the body having the moveable jaw together, and the body including the fixed jaw having a releasable braking means for releasably preventing the fixed jaw and moveable jaws from separating, and wherein the ladder hook assembly is engaged with the building clamp assembly and includes a cylindrical slide member having a removed end, which the cylindrical slide member slideably and rotationally engages the with round apertures in the body including the fixed jaw and the body having the moveable jaw, and a locking member, which releasably fixes a distance of the removed end of the slide member with respect to the body including the fixed jaw, the method including the steps of:

first securing a first device of the pair to the building by attached of the first device between the body including the fixed jaw and the body having the moveable jaw thereof, followed by securing the slide member of the ladder hook assembly of the first device to either a first rung end or first rail of the ladder; and second securing a second device of the pair to the building by attachment of the second device between the body including the fixed jaw and the body having the moveable jaw thereof, followed by securing the slide member of the ladder hook assembly of the second device to either a second rung end or a second rail of the ladder.

* * * * *